3,171,779
PLANT COMPOSITION

Frederic C. McCoy, Beacon, and Edwin C. Knowles, Poughkeepsie, N.Y., assignors to Texaco Inc., New York, N.Y., a corporation of Delaware
No Drawing. Filed Dec. 27, 1961, Ser. No. 162,552
17 Claims. (Cl. 167—42)

The present invention relates to compositions for the treatment of plants containing one or more fungicidal, insecticidal including acaracidal, and other pesticidal materials, and mixtures of such materials.

In copending, commonly assigned patent application Serial No. 158,112, filed December 8, 1961, there are disclosed compositions to prevent or control fungus diseases and attacks by insects and pests on plants. Broadly, the plant compositions of the copending application comprise a hydrocarbon-insoluble active component, a hydrocarbon fraction and a specific oil-soluble polymeric dispersant, namely, vinyl pyrrolidone-alkyl methacrylate copolymers to disperse the active compenent in the hydrocarbon fraction component.

The present invention involves the discoverey that superior plant compositions to control fungus diseases and attacks by insects and pests are formulated by suspending hydrocarbon-insoluble active materials in a hydrocarbon fraction using minor amounts of microdimensional hydrocarbon-insoluble fibrous materials in combination with oil soluble polymeric materials as a suspending matrix.

One of the advantages of the compositions of the present invention over the plant compositions of copending application Serial No. 158,112, is that the matrix-containing compositions exhibit superior stability in the concentrated and diluted forms on standing for relatively long periods of time. A further advanage for the matrix-containing compositions is that any sediment formed on standing is soft and readily redispersible in the hydrocarbon fraction by agitation or restirring. A still further advantage is the improved adhesiveness of the compositions of this invention to the surface of the plants after being applied thereto. Other advantages will be readily apparent to those skilled in the art from the following description.

The plant treatment compositions of the present invention are formed from a hydrocarbon-insoluble active component having an average particle size of not greater than about 6 microns, a hydrocarbon fraction component as the carrier or base liquid, an oil-soluble polymeric material and a minor amount of hydrocarbon-insoluble microdimensional fibrous material. The compositions of the present invention are stable for long periods of time and remain substantially so when diluted with one or more parts by weight of a hydrocarbon fraction having the same general characteristics of the hydrocarbon fraction used to prepare the composition.

The proportions of the respective components of the compositions are as follows: The hydrocarbon-insoluble active material, which may be one or more inorganic or one or more organic compounds, or a mixture of inorganic and organic compounds, is generally present in an amount from about 0.1 to about 50 percent by weight. The polymeric agent is employed in an amount of from 1 to about 40 percent by weight. The hydrocarbon fraction is present in an amount of from about 10 percent to about 98.7 percent by weight. The microdimensional fibrous material is present in an amount of from about 0.2 percent to 3.0 percent.

The preferred range for the compositions of the present invention is as follows: active component 1 to 30 percent; polymeric dispersant 1 to 15 percent; microdimensional fibrous material 0.1 to 3.0 percent; hydrocarbon fraction 52 to 98 percent; on a weight basis. A particularly preferred composition comprises 5 to 15 percent active component, 5 to 10 percent vinyl pyrrolidone-alkyl methacrylate copolymer dispersant, 1 to 2 percent asbestos fibrous material and 73 to 89 percent of a hydrocarbon fraction.

The concentrated plant treating composition of the present invention can be diluted with from about 0.5 up to about 20 parts, and preferably 1 to 5 parts by weight, of a hydrocarbon fraction having the same general characteristics as the hydrocarbon component of the fungicidal composition. Hydrocarbon fractions having somewhat different characteristics than the hydrocarbon fraction in the composition can be employed as the hydrocarbon diluent without adversely affecting the activity of the suspended hydrocarbon-insoluble active component in the resultant diluted composition.

Hydrocarbon-insoluble active materials suitable for use in the present invention include inorganic compounds such as for example, cooper hydroxide, copper oxide, tribasic copper sulfate, copper arsenite, copper oxychloride-sulfate, calcium arsenate, lead arsenate, sodium fluoride, sulfur, mixtures thereof, as well as organic compounds such as manganese ethylene bis(dithiocarbamate), 1-naphthyl-N-methyl-carbamate, 3-[2-(3,5 dimethyl-2-oxycyclohexyl)-2-hydroxyethyl]glutarimide (also known as cycloheximide), sodium-, zinc- and iron-alkyl dithiocarbamates, tetramethyl thiuram disulfide and N-trichloromethylmercapto-4-cyclohexane-1,2-dicarboximide, mixtures thereof, as well as mixtures of such inorganic and organic compounds. Generally, the active component of our invention is less than about 1.0 weight percent soluble in the hydrocarbon fraction. As used in this specification, "hydrocarbon insoluble" means a solubility not greater than about 1.0 percent by weight in the hydrocarbon fraction used.

By the term "active component" is meant a fungicidal, insecticidal, acaracidal or pesticidal material or mixtures thereof used in agricultural practice to kill or control fungus diseases and/or attacks by insects and/or pests on plants.

The hydrocarbon-insoluble active component of the compositions of the present invention has an average particle size of about 0.01 to 6 microns or less, preferably an average particle size of about 0.05 to 2.5 microns. In the case of the use of an inorganic compound such as copper hydroxide as the active material, the copper hydroxide particles should have a particle size of less than 1 micron, preferably 0.01 to 1 micron. Such finely divided copper hydroxide particles can be prepared by the method disclosed in U.S. 2,738,283 and Reissue U.S. 24,324.

By the term "hydrocarbon fraction" is meant those hydrocarbon fractions normally used in agricultural applications. Broadly, these hydrocarbon fractions may encompass the boiling range from kerosene through heavy lubricating oil cuts and mixtures thereof having a minimum flash point of about 200° F., and desirably boiling in the range of from about 350 to about 800° F.

For particular applications it is desirable that such fractions have an aromatics content below about 20% by weight, preferably less than about 10 to 15%. In applying fungicidal organic and/or inorganic materials to growing banana plants, for example, it is particularly desirable to employ hydrocarbon mineral oils having a boiling point range between about 600 and 750° F., an aromatics content below 15% by weight, a viscosity at 100° F. of between about 75 to 100 SUS, and an unsulfonatable residue of at least 85%, preferably 90% or more, by weight.

Representative characteristics of suitable hydrocarbon fractions that can be used in preparing the compositions of the present invention are as follows:

Oil A is a refined fraction from a paraffin base crude oil having a flash point of 270° F., a viscosity at 100° F. of 41.2 SUS, a boiling range of 508 to 650° F. and an unsulfonatable residue of 95%. Oil B is a blend of a wax distillate fraction from a refined paraffin base crude together with a residium fraction from a refined paraffin base crude. Oil B has a flash point of 355° F., a viscosity at 100° F. of 87 SUS, a boiling range of 617 to 853° F. and an unsulfonatable residue of 90%. Oil C is similar to Oil B, having a flash point of 355° F., a viscosity at 100° F. of 85 SUS, a boiling range of 630 to 752° F. and an unsulfonatable residue of 93%.

The polymeric component of the present invention comprises an oil soluble relatively high molecular weight polymeric material that leaves a tacky residue on the plant when in contact therewith. Suitably, these polymeric materials should have a minimum average molecular weight of about 1000 units, as measured by conventional methods, for example by light scattering, osmosis, boiling point and viscosity.

Representative polymeric materials for the compositions of the invention include a copolymer prepared from a mixture of monomers comprising, on a weight basis, 4 to 15 percent vinyl pyrrolidone, 85 to 96 percent alkyl methacrylate or a mixture of alkyl methacrylates, the alkyl portion of the alkyl methacrylate containing from 4 to 18 carbon atoms; a copolymer of alkyl methacrylates containing from 4 to 18 carbon atoms; and polybutene homopolymers.

A particular copolymeric agent comprises a copolymer formed from a mixture of monomers comprising 6 to 10% vinyl pyrrolidone, 25 to 35% stearyl methacrylate, 15 to 55% lauryl methacrylate, and 10 to 14% butyl methacrylate, on a weight basis. A particularly preferred copolymer is formed from 8% vinyl pyrrolidone, 30% stearyl methacrylate, 50% lauryl methacrylate and 12% butyl methacrylate. Such a copolymer is disclosed in copending patent application Serial No. 158,112.

A representative polymeric material of the mixed alkyl methacrylate type comprises an admixture obtained by copolymerizing a mixture containing 10 to 40 percent butyl methacrylate, 50 to 80 percent lauryl methacrylate and 5 to 15 percent stearyl methacrylate. A preferred starting mixture contains 25% butyl methacrylate, 65% lauryl methacrylate and 10 percent stearyl methacrylate.

Suitable polymeric materials of the polybutene type range in molecular weight from about 1000 to over 200,000, the upper range being limited only by adequate solubility in the hydrocarbon carrier. These polymers are prepared from butenes, including isobutenes by conventional procedures.

The fourth component of the compositions of the present invention is a microdimensional fibrous material. The fibrous material, which is substantially hydrocarbon insoluble, acts as a co-suspending agent with the polymer component in establishing and maintaining the active component suspended in the hydrocarbon fraction component for relatively long periods of time. In addition, the fibrous material assists in formation of soft, easily workable gels that are readily dilutable with additional quantities of the hydrocarbon fraction component without adversely effecting the suspension of the active component in the hydrocarbon.

The fibrous materials, which may be of the organic or inorganic type as long as they are essentially hydrocarbon-insoluble, provide the necessary matrix for retaining the hydrocarbon-insoluble powdered active material in stable suspension and form gels which are of a soft, easily worked consistency which can be readily diluted with additional amounts of hydrocarbon liquid while still retaining the active material in stable suspension.

The microdimensional fibers employed as suspending matrices are insoluble in and non-reactive with the hydrocarbon liquid components. Effective inorganic fibers are asbestos fibers, graphite fibers, glass fibers of various types and quartz fibers. Chrysotile fibers are a particularly preferred type of asbestos fibers while soda-lime glass fibers, quartz microfibers, boro-silicate (Pyrex) fibers and lead glass microfibers are examples of effective glass microfibers. Organic microfibers effective in forming the stable dispersions of this invention are cellulose fibers and fibers of a large number of cellulose derivatives such as nitrocellulose, carboxylated cellulose, acetylated cellulose, aminoethyl cellulose, cellulose phosphate and carboxymethyl cellulose. Other effective organic microfibers are perfluoroethylene fibers, fibers of polyhalogenated olefin polymers, polypropylene fibers, polyvinyl alcohol fibers and polyvinyl acetal fibers. Glass, cellulose and asbestos fibers have proven particularly effective in forming the stable suspensions of this invention.

The average fiber diameter of the microfibers is an important factor in preparing the stable suspensions of this invention. There is a substantial difference between the organic and inorganic microfibers with regard to the average fiber diameter required for the preparation of stable suspensions. The difference is due at least in part to the different densities and structural configurations of inorganic and organic microfibers.

When employing inorganic microfibers it is necessary to employ microfibers having an average fiber diameter between 0.01 and 2.0 microns and preferably between 0.01 and 0.5 micron in order to form stable suspensions. When the inorganic microfiber diameter is above 2.0 microns, the fibers do not provide an adequate matrix for the suspension and maintenance of the insoluble powdered material in the form of a stable suspension.

In contract, organic microfibers having fiber diameters as large as 20 microns can be used in preparing stable suspensions although preferably the suspensions are prepared with organic microfibers having an average fiber diameter between about 1 and 12 microns. The upper fiber diameter limit of 20 microns for organic microfibers is critical for the formation of stable suspensions in the same manner as is the upper fiber diameter limit of 2 microns for inorganic microfibers. Stable suspensions are not formed with inorganic microfibers having an average fiber diameter above 2.0 microns or with organic microfibers having a fiber diameter above 20 microns.

The concentration of the microdimensional glass fibers is between about 0.2 and 3 weight percent of the total dispersion. To a large extent the concentration of fibers in the composition is proportional to the amount of active material suspended in the hydrocarbon component. Generally, the microdimensional glass fiber concentration usually falls between about 1 and 3 percent by weight. In diluted compositions, where the active ingredient concentration is between about 2 and 8 percent by weight, the microfiber concentration is in the lower portion of the prescribed range, namely 0.2 and 1.0 percent by weight.

For application from aircraft it has been found that the compositions of the present invention are efficiently employed when diluted with from 3 to 5 parts of a hydrocarbon fraction when using about a 30% concentration of the active component in the hydrocarbon concentrate. In aerial spraying operations, the diluted compositions can be applied at the rate of from about 2 up to about 5 gallons per acre although application rates of from about 0.5 up to about 8 to 10 gallons per acre can be used with satisfactory results.

It is preferred that the compositions of the present invention also contain a supplementary suspending agent consisting of finely divided particles of silica. These silicon dioxide particles should have an average particle diameter in the range of from about 100 to 400 Angstroms. A pyrogenic silicon dioxide known by the trade name Cab-O-Sil and prepared by flame hydrolysis has been found to be particularly effective in the compositions of this invention. This ultrafine silicon dioxide has an average particle diameter in the range of from 150 to 250 Angstroms and a surface area of about 175 to 200 square meters per gram. The finely divided silica particles are employed in amounts of from 0.05 to 5 percent by weight of the composition. In the preferred modification pyrogenic silicon dioxide can be used in minor amounts in the compositions of the present invention such as from about 0.1 up to about 4 percent by weight, based on the weight of the composition. Excellent results can be obtained using amounts of a pyrogenic silicon dioxide in the range of from about 0.75 to 2.5 percent by weight, based on the weight of the composition.

The finely divided silicon dioxide particles appear to function in the compositions of the invention as supplementary suspending agents to the microfibers.

The compositions of the present invention can be prepared in the following manner. An admixture of the active component, for example, finely divided copper hydroxide, 8% vinyl pyrrolidone–92% alkyl methacrylate copolymer agent, microdimensional fibrous material and a hydrocarbon fraction such as an oil fraction of the type designated above as Mineral Oil A, is formed and intimately mixed in a suitable mixing vessel equipped with a stirring device. The respective components are admixed and there is obtained a uniform fluid suspension of the copper hydroxide particles in the hydrocarbon mineral oil. If desired, the respective components can first be mixed in a suitable vessel and then passed through a colloid mill.

Following is a description by way of example of methods of carrying out the practice of the present invention.

EXAMPLES 1 AND 2

Table I shows the results of a series of compositions containing varying amounts of hydrocarbon-insoluble active material, a hydrocarbon mineral oil, a fibrous material and a polymeric agent. This table demonstrates the effectiveness of the polymer-fibrous materials in forming stable suspensions. In addition, the table shows the appearance of the respective concentrated compositions after standing for varying periods of time and further reports the results of inspections on the compositions after dilution with diluent oil to an active component concentration of 5%.

Table I
WEIGHT PERCENT

|  | Example 1 | Example 2 |
|---|---|---|
| Mineral Oil A | 87 | 57 |
| Vinyl pyrrolidone-alkyl methacrylate copolymer [1] |  | 10 |
| Asbestos fibers (Chrysotile) |  | 1 |
| Pyrogenic silicon dioxide | 2 | 2 |
| Glass microfibers | 1 |  |
| Copolymer of $C_4$ to $C_{18}$ methacrylates | 5 |  |
| 1-naphthyl N-methyl carbamate | 5 | 30 |
| Inspections on Samples of Compositions: |  |  |
| Storage, weeks | [2] 35 | [3] 22 |
| Blend diluted to 5% vol. with active ingredient with oil "A", stored 24 hrs.—Amount of putty-like sediment |  | None |

[1] 8% vinyl pyrrolidone–92% mixed $C_4$-, $C_{12}$-, $C_{18}$-methacrylates.
[2] Slight oil layer on top, rest soft gel. No cake, some sediment.
[3] No oil layer, soft gel.

Inspection of the data in Table I above shows that the compositions of the invention form stable dispersions which are substantially free from deterioration after standing for relatively long periods of time. In addition, the data show that the resultant suspensions are semifluid gels that are free from caking. Further, the data for Example 2 show that no putty-like sediment was observed after dilution of the concentrate with oil to a concentration of 5% of insecticide. These examples demonstrate that the combination of polymeric agent and microdimensional fibrous materials form very stable suspensions of an active insecticidal material in a hydrocarbon fraction.

The following Table II shows further data of representative examples of the compositions of the invention.

Table II
WEIGHT PERCENT

|  | Control A | Ex. 3 | Ex. 4 | Ex. 5 | Ex. 6 | Ex. 7 | Ex. 8 | Ex. 9 |
|---|---|---|---|---|---|---|---|---|
| Mineral Oil A | 60 | 56 | 57 | 59.5 | 52 | 62 | 58 | 57 |
| 8% vinyl pyrrolidone, 92% alkyl methacrylate copolymer [1] | 10 | 10 | 10 | 7.4 | 15 | 5 | 10 | 10 |
| Asbestos Fibers (Chrysotile) |  | 1 |  | 1. | 1 | 1 | 1 | 1 |
| Pyrogenic silicon dioxide |  | 3 | 2 | 2 | 2 | 2 | 1 | 2 |
| Cellulose Pulp |  |  | 1 |  |  |  |  |  |
| Manganese ethylene bis(dithiocarbamate) | 30 | 30 | 30 | 30 | 30 | 30 | 30 | 30 |
| Storage, weeks | [2] 22 | [3] 22 | [4] 22 | [5] 51 | ([6]) | ([6]) | ([6]) | [7] 22 |
| Blend diluted to 5% vol. active component with Oil A stored 24 hours—Amount of putty-like sediment | Small | None | Small | None | None | ([8]) |  | None |

[1] The alkyl methacrylate monomers were 12% butyl-, 30% stearyl, 50% lauryl methacrylates.
[2] Almost complete separation of fungicide. 1 in. dense putty on bottom.
[3] Soft gel, no oil layer.
[4] Slight oil separation, rest soft gel.
[5] ⅛ in. oil layer, rest uniform gel.
[6] 3 days; soft gel, no sed.
[7] Soft gel slight oil separation, no sed.
[8] After 22 wks.—none, soft paste easily redispersible.

Example 3 shows that the use of fibrous asbestos in the composition of fungicide and oil provides a stable suspension for a relatively long period of time. In contrast, Control Example A, without a fibrous material, shows almost a complete separation of fungicide and oil and collection of the active component on the bottom of the storage container. These comparative data demonstrate the superiority of the compositions of the invention when they contain minor amounts of microdimensional fibrous material.

Example 4 illustrates the use of cellulose pulp as the matrix.

In Example 5, although some small degree of oil separation was observed after standing for 21 weeks, it is to be noted that no sediment was found in the diluted

Table III
WEIGHT PERCENT

|  | Control B | Ex. 10 | Control C | Ex. 11 | Ex. 12 |
|---|---|---|---|---|---|
| Mineral Oil A | 94.5 | 84.5 | 94.0 | 84.0 | 84.5. |
| Polybutene (1800 M.W.) |  | 10.0 |  | 10.0 |  |
| Polybutene (above 50,000 M.W.) |  |  |  |  | 10.0.[1] |
| Chrysotile asbestos |  |  | 1.0 | 1.0 |  |
| Glass microfibers | 0.5 | 0.5 |  |  | 0.5. |
| Cupric hydroxide | 5.0 | 5.0 | 5.0 | 5.0 | 5.0. |
| Appearance after standing 24 hrs. | ⅛" to ¼" clear oil | Very little oil separation. More uniform than Control B. | ½" clear oil on top. | ⅛" clear oil on top. Rest is smooth, uniform suspension. | Slight oil separation. Smooth, uniform suspension. |

[1] Added as a 50% concentrate of polybutene in mineral oil.

sample of the concentrate after storage for 24 hours.

Examples 6 to 9 inclusive show that stable, semi-fluid gel-like suspensions are formed with varying amounts of the respective components, namely active component, polymeric agent, hydrocarbon fraction, and fibrous material, with or without silicon dioxide. The lack of any putty-like sediment forming on dilution of the concentrates with oil to a 5% concentration of active component for Examples 5 to 8 inclusive is particularly noteworthy since it is about at this concentration that the compositions would be applied in field use. The composition of Example 9 was a stable suspension on standing.

Table III above sets forth additional examples illustrating the compositions of the invention.

Table IV
WEIGHT PERCENT

|  | Control D | Ex. 13 | Ex. 14 | Ex. 15 | Ex. 16 | Ex. 17 |
|---|---|---|---|---|---|---|
| Mineral Oil A | 69 | 52 | 53 | 56 | 53 | 87 |
| 8% vinyl pyrrolidone, 92% alkyl methacrylate copolymer [1] | 15 | 15 | 15 | 12 | 15 |  |
| Copper hydroxide | 15 | 30 | 30 | 30 | 30 | 5 |
| Cab-O-Sil | 1 |  | 1 | 1 | 1 | 2 |
| Asbestos Fibers (Chrysotile) |  | 3 | 1 | 1 | 1 |  |
| Glass microfibers |  |  |  |  |  | 1 |
| Hi-Sil |  |  |  |  | 1 |  |
| Mixed alkyl methacrylate polymers [2] |  |  |  |  |  | 5 |
| Storage, weeks | [3] 31 | [4] 30 | [4] 30 | [5] 23 | [6] 23 | [7] 37 |
| Blend diluted to 5% vol. active ingredient with Mineral Oil A stored 24 hrs.—Amount of putty-like sediment | Small | None | None | None | None |  |

[1] The alkyl methacrylate monomers were 12% butyl-, 30% stearyl, 50% lauryl methacrylates.
[2] Copolymers of 25% butyl, 65% lauryl and 10% stearyl methacrylates.
[3] ¼" oil layer, bottom 1" dense gel.
[4] ¼" oil layer, rest soft gel.
[5] ¼" oil layer, rest medium soft gel.
[6] Very slight oil layer, rest soft gel.
[7] Slight oil layer, rest soft gel.

Control "B" and "C" examples show that the use of microglass or asbestos fibers without a polymeric agent results in the formation of a non-homogeneous suspension with considerable oil separation on standing overnight.

Examples 10 and 11 show that using a polybutene of 1800 molecular weight together with microglass or asbestos fibers produces a more homogeneous fluid suspension of the copper fungicide with less oil separation.

Example 12 shows that a polybutene of much higher molecular weight than was used in Examples 10 and 11 is equally effective in producing smooth suspensions that have only a slight tendency to form oil layers on standing.

Table IV above illustrates further compositions of the invention.

Control Example "D" shows that in the absence of microfibrous materials in the composition, the resultant suspension on standing develops a dense gel on the bottom of the container. Moreover, dilution of Control Example D to a concentration of 5% of copper fungicide causes the formation of considerable putty-like sediment in the container when allowed to stand overnight.

Example 13, containing twice as much copper hydroxide fungicide as Control Example D, contains microfibers in the composition. The table shows that the bottom portion of the dispersion, after standing for 30 weeks, was a soft gel. Moreover, the diluted sample was free from sediment after being allowed to stand overnight.

Examples 14 to 15 inclusive are noteworthy for the lack of any sediment appearing after the compositions were diluted to a 5% copper hydroxide fungicide concentration and allowed to remain standing overnight.

Example 17 further illustrates that a mixed methacrylate copolymer agent in combination with microfibrous materials can produce very stable soft gel-like compositions.

We claim:

1. A pesticidal composition for the treatment of plants comprising 0.1 to 50% by weight of a hydrocarbon mineral oil insoluble pesticidal material having an average particle size not greater than about 6 microns in diameter, about 1 to 40% by weight of an oil soluble polymeric material, about 0.2 to 3% by weight of a hydrocarbon mineral oil insoluble microdimensional fibrous material and about 10 to 98.7% by weight of a carrier oil, said pesticidal material being selected from the group consisting of the sodium, zinc, iron and manganese salts of ethylene dithiocarbamate, copper hydroxide, copper oxide, tribasic copper sulfate, copper arsenite, copper oxychloride-sulfate, calcium arsenate, lead arsenate, sodium fluoride, sulfur, tetramethyl thiuram disulfide, 1-naphthyl N-methyl carbamate, 3-[2-(3,5-dimethyl-2-oxycyclohexyl)-2-hydroxyethyl]glutarimide, N-trichloromethylmercapto-4-cyclohexene-1,2-dicarboximide and mixtures thereof, said polymeric material being selected from the group consisting of a polybutene homopolymer having a molecular weight of at least 1000, a $C_4$–$C_{18}$ alkyl methacrylate polymer prepared from a mixture of 10 to 40% by weight butyl methacrylate, 50 to 80% by weight lauryl methacrylate and 5 to 15% by weight stearyl methacrylate, and a vinyl pyrrolidone-alkyl methacrylate copolymer prepared from a mixture of monomers comprising 4–15% by weight of vinyl pyrrolidone and 85–96% by weight of an alkyl methacrylate wherein the alkyl group contains from 4 to 18 carbon atoms, said microdimensional fibrous material being selected from the group consisting of inorganic microfibers, having an average fiber diameter between 0.01 and 2.0 microns, and organic microfibers, having an average fiber diameter between 1 and 20 microns, wherein said polymeric material and said fibrous material are effective to disperse and maintain said pesticidal material in suspension in said carrier oil.

2. A composition as claimed in claim 1 wherein the hydrocarbon oil-insoluble pesticidal material has an average particle size of from about 0.01 to 2.5 microns.

3. A composition as claimed in claim 1 containing copper hydroxide as the pesticidal material.

4. A composition as claimed in claim 1 containing manganese ethylene bis(dithiocarbamate) as the pesticidal material.

5. A composition as claimed in claim 1 containing 1-naphthyl N-methyl carbamate as the pesticidal material.

6. A composition as claimed in claim 1 containing copper oxychloride sulfate as the pesticidal material.

7. A composition as claimed in claim 1 containing 3-[2-(3,5 dimethyl-2-oxycyclohexyl)-2-hydroxyethyl] glutarimide as the pesticidal material.

8. A composition as claimed in claim 1 wherein the pesticidal material comprises a mixture of finely divided copper hydroxide and 1-naphthyl N-methyl carbamate.

9. A composition as claimed in claim 1 wherein the inorganic fibrous material is an asbestos fiber.

10. A composition as claimed in claim 1 wherein the inorganic fibrous material is a microglass fiber.

11. A composition as claimed in claim 1 containing from 0.1 to 4 percent by weight of finely divided pyrogenic silicon dioxide, based on the weight of the composition.

12. A composition as claimed in claim 1 wherein the carrier oil is a lubricating oil fraction having a boiling point temperature range at atmospheric pressure of 475 to 675° F. and a flash point above 260° F. and an unsulfonatable residue of at least 85 percent.

13. A composition as claimed in claim 12 wherein the lubricating oil fraction has an unsulfonatable residue of at least 90 percent.

14. A composition as claimed in claim 1 wherein the polymeric material is prepared from a mixture of monomers comprising 6 to 10 percent vinyl pyrrolidone, 25 to 35 percent stearyl methacrylate, 45 to 55 percent lauryl methacrylate and 10 to 14 percent butyl methacrylate, on a weight basis.

15. A composition as claimed in claim 14 wherein the copolymer is prepared from a mixture of monomers comprising 8 percent vinyl pyrrolidone, 30 percent stearyl methacrylate, 50 percent lauryl methacrylate and 12 percent butyl methacrylate, on a weight basis.

16. A composition as claimed in claim 1 wherein the organic fibrous material is a cellulose fiber.

17. Method of protecting a plant against attack by pests which comprises applying to said plant the composition of claim 1.

References Cited in the file of this patent

UNITED STATES PATENTS

| | | |
|---|---|---|
| 2,322,723 | Young | June 22, 1943 |
| 2,481,100 | Fox | Sept. 6, 1949 |
| 2,491,287 | Smith et al. | Dec. 13, 1949 |
| 2,652,323 | Mowry et al. | Sept. 15, 1953 |
| 2,798,022 | Yowell et al. | July 2, 1957 |
| 3,030,303 | Ryan | Apr. 17, 1962 |
| 3,045,394 | Coulter | July 4, 1962 |

FOREIGN PATENTS

| | | |
|---|---|---|
| 802,111 | Great Britain | Oct. 1, 1958 |

OTHER REFERENCES

Hanna: Handbook of Agricultural Chemicals, 2nd ed., published by L. W. Hanna, Rt. 1, Box 210, Forest Grove, Oregon, U.S.A. (1958), pages 160, 170, 182 and 329.

UNITED STATES PATENT OFFICE

CERTIFICATE OF CORRECTION

Patent No. 3,171,779                              March 2, 1965

Frederic C. McCoy et al.

It is hereby certified that error appears in the above numbered patent requiring correction and that the said Letters Patent should read as corrected below.

Column 2, line 27, for "cooper" read -- copper --; column 4, line 46, for "contract" read -- contrast --; columns 5 and 6, Table II, fifth column, line 2 thereof, for "7.4" read -- 7.5 --; same Table II, fifth column, line 7 thereof, for "51" read -- 21 --.

Signed and sealed this 23rd day of November 1965.

(SEAL)
Attest:

ERNEST W. SWIDER
Attesting Officer

EDWARD J. BRENNER
Commissioner of Patents